United States Patent [19]
Reed et al.

[11] Patent Number: 4,874,399
[45] Date of Patent: Oct. 17, 1989

[54] ELECTRET FILTER MADE OF FIBERS CONTAINING POLYPROPYLENE AND POLY(4-METHYL-1-PENTENE)

[75] Inventors: John F. Reed, Arden Hills; Marvin E. Jones, Stillwater, both of Minn.

[73] Assignee: Minnesota Mining and Manufacturing Company, St. Paul, Minn.

[21] Appl. No.: 147,989

[22] Filed: Jan. 25, 1988

[51] Int. Cl.$^4$ .............................................. B01D 35/06
[52] U.S. Cl. ............................................ 55/2; 55/101; 55/155; 55/527; 55/DIG. 35; 55/DIG. 39
[58] Field of Search ............. 55/2, 101, 155, DIG. 39, 55/527, 528, DIG. 35; 307/400

[56] References Cited

U.S. PATENT DOCUMENTS

| | | | |
|---|---|---|---|
| Re. 30,782 | 10/1981 | van Turnhout | 264/22 |
| Re. 31,087 | 11/1982 | Sohl | 210/671 |
| Re. 31,285 | 6/1983 | van Turnhout | 55/155 |
| 2,810,426 | 10/1957 | Till et al. | 55/DIG. 39 |
| 3,487,610 | 1/1970 | Brown et al. | 307/400 X |
| 3,607,754 | 9/1971 | Asahina et al. | 307/400 |
| 3,627,677 | 12/1971 | Dyrud | 210/23 |
| 3,783,588 | 1/1974 | Hudis | 55/135 X |
| 3,841,953 | 10/1974 | Lohkamp et al. | 161/150 |
| 4,215,682 | 8/1980 | Kubik et al. | 128/205.29 |
| 4,288,584 | 9/1981 | Mishra | 526/348.4 |
| 4,323,374 | 4/1982 | Shinagawa et al. | 55/489 X |
| 4,375,718 | 3/1983 | Wadsworth et al. | 29/592 E |
| 4,513,049 | 4/1985 | Yamasaki et al. | 307/400 X |
| 4,588,537 | 5/1986 | Klasse et al. | 264/22 |
| 4,592,815 | 6/1986 | Nakao | 204/165 |
| 4,626,263 | 12/1986 | Inoue et al. | 55/DIG. 39 |
| 4,749,348 | 6/1988 | Klasse et al. | 55/DIG. 39 |

FOREIGN PATENT DOCUMENTS

| | | | |
|---|---|---|---|
| 10313 | 2/1981 | Japan | 55/DIG. 39 |
| 10314 | 2/1981 | Japan | 55/DIG. 39 |
| 824448 | 12/1959 | United Kingdom | 55/DIG. 39 |
| 1337753 | 11/1973 | United Kingdom | 55/DIG. 39 |

*Primary Examiner*—Robert Spitzer
*Attorney, Agent, or Firm*—Donald M. Sell; Walter N. Kirn; Roger R. Tamte

[57] ABSTRACT

A fibrous electret filter better sustains electret filtration enhancement upon exposure to aerosol oils when made of fibers containing polypropylene and at least one percent by weight of poly(4-methyl-1-pentene). Even better stability is attained when the poly(4-methyl-1-pentene) content of the electret filter is ten percent by weight of total polyolefin. When used as an air filter, such as in a respirator, the electret filter has surprisingly better filtration performance than does a comparable electret filter made of 100% polypropylene fibers. The electret filter can be made either of melt-blown microfibers or of fibers of fibrillated film.

20 Claims, 5 Drawing Sheets

ELECTRET FILTER MADE OF FIBERS CONTAINING POLYPROPYLENE AND POLY(4-METHYL-1-PENTENE)

BACKGROUND ART

1. Field of the Invention

The invention concerns electret-enhanced filter media (more simply called "electret filters") made of fibers such as melt-blown microfibers or fibers obtained by fibrillating a film. The invention concerns fibrous electret filters for removing particulate matter from fluids and improved fibers for making those filters. The invention is especially concerned with respirators and the problem of improving the ability of filter media to accept filtration-enhancing electrostatic charges and to sustain that electret filtration enhancement in the presence of oily aerosols.

2. Description of the Related Art

For many years nonwoven fibrous filter webs have been made from polypropylene using melt-blowing apparatus of the type described in Report No. 4364 of the Naval Research Laboratories, published May 25, 1954, entitled "Manufacture of Super Fine Organic Fibers" by Van Wente et al. Such melt-blown microfiber webs continue to be in widespread use for filtering particulate contaminants, e.g., as face masks and as water filters. Melt-blown polypropylene microfiber webs are also used for other purposes, e.g., to remove oil from water as taught in U.S. Pat. No. 3,627,677 (Dyrud) and Re. 31,087 (Sohl). While the web of each example of those two patents is made of polypropylene microfibers, the latter patent says that adequate results are provided by microfibers of other polyolefin polymers, among which is "poly 4-methylpentene" that is more properly called poly(4-methyl-1-pentene) or poly-4-methylpentene-1. Poly(4-methyl-1-pentene) is available as "TPX" from Mitsui Petrochemical Industries, Ltd., and is sometimes here called "PMP".

U.S. Pat. No. 3,841,953 (Lohkamp et al.) says that nonwoven melt-blown microfiber webs can be made by melt-blowing a blend of two or more thermoplastic resins and that one of the advantages "is that an expensive polymer can be diluted to a certain degree with an inexpensive polymer without detracting too much from the gross properties of the expensive polymer." All the examples employ polypropylene as one of the resins, and in Example 3: "Pellet blends of poly-4-methylpentene-1 (TPX) were melt blown with Enjay CD 392 polypropylene resin" to provide "(v)ery good quality webs" or mats that "had improved temperature resistance as the amount of poly-4-methylpentene-1 increased."

U.S. Pat. No. 4,215,682 (Kubik et al.) teaches that the filtering efficiency of a melt-blown microfiber web can be improved by a factor of two or more when the "melt-blown fibers are bombarded as they issue from the orifices with electrically charged particles such as electrons or ions", thus making the fibrous web an electret. All of the examples employ melt-blown polypropylene microfibers which the Kubik patent says are especially useful, while saying that other polymers may also be used "such as polycarbonates and polyhalocarbons that may be melt-blown and have appropriate volume-resistivities under expected environmental conditions." Other techniques for providing electret enhancement are described in U.S. Pat. No 4,375,718 (Wadsworth); U.S. Pat. No. 4,588,537 (Klaase); and U.S. Pat. No. 4,592,815 (Nakao).

Fibrous filters for removing particulate contaminants from the air are also made from fibrillated polypropylene films. Electret filtration enhancement can be provided by electrostatically charging the film before it is fibrillated as taught in U.S. Pats. No. Re. 30,782 (Van Turnhout) and Re. 31,285 (Van Turnhout et al.).

U.S. Pat. No. 4,288,584 (Mishra) says that "common polymers such as polyesters, polycarbonates, etc. can be formulated initially as highly charged electrets but these charges are short-lived especially under humid conditions... It has also been proposed to make electrets from simple polyolefins such as polyethylene and polypropylene... Unfortunately such electrets are not very stable" (col. 1, lines 22-31). Mishra discovered that "a stable electret can be obtained from a resinous polymer of an alpha-olefin having a branched side chain which polymer has a degree of crystallinity of at least 20% and is composed of repeating units having the structure

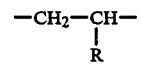

where R is a branched alkyl radical having from 3 to 10 carbon atoms." The electret structures mentioned in the Mishra patent are films or sheets which "find applications as the electrostatic element in electro-acoustic devices such as microphones, headphones and speakers and in dust particle control, high voltage electrostatic generators, electrostatic recorders and other applications" (col. 3, lines 37-43).

Fibrous polypropylene electret filters that are currently on the market, some made from melt-blown polypropylene microfibers and others from fibrillated polypropylene film, show stable electret filtration enhancement under the test conditions of the Mishra patent. From Mishra's test data, PMP would appear to offer no advantage in fibrous electret filters, and no fibrous electret filter made of PMP is known to be on the market. Of the polyolefins coming within the above-reproduced formula of the Mishra patent, only PMP is commercially available, and raw materials for making any of the other polyolefins currently cost far more than do those from which PMP is made.

Unfortunately, fibrous electret filters made of polypropylene, whether melt-blown microfibers or fibrillated film, tend to lose their electret enhanced filtration efficiency faster than desired for some purposes when exposed to aerosol oils. There is a growing awareness of the need to improve the long-term efficiency of air filters in the presence of aerosol oils, especially in respirators. 30 C.F.R. Part 11, subpart K, describes current protocols for testing particulate air filters with an oily aerosol challenge of dioctyl phthalate (DOP) particles.

SUMMARY OF THE INVENTION

The invention provides fibrous electret filters which have improved electret filtration enhancement and sustain that enhancement upon exposure to aerosol oils much better than do electret filters made of 100% polypropylene fibers. Furthermore, the fibrous electret filters of the invention maintain functional filtration-enhancing charge levels under accelerated aging conditions. This significant advance in the art is realized when a fibrous electret filter of the invention is made either of melt-blown microfibers or fibers obtained by fibrillating film.

The electret filter of the invention is made of fibers containing at least one percent by weight of poly(4-methyl-1-pentene) or PMP and preferably polypropylene. When used as an air filter, such as in a respirator, the novel electret filter has surprisingly better filtration performance than does a comparable electret filter made of 100% polypropylene fibers, as indicated by remarkably high quality or "Q" values obtained as described below under "Testing". Even when the PMP content of the novel electret filter is only ten percent by weight of total polyolefin, its ability to sustain electret filtration enhancement upon exposure to aerosol oils appears to be substantially equal to that of a comparable electret filter made from 100% PMP.

When the proportion of PMP is less than ten parts by weight per 100 parts of total polyolefin, the resistance of the novel electret filter to loss of electret enhancement upon exposure to aerosol oils progressively decreases, but even at one percent, its stability of electret enhancement when exposed to an oily mist is appreciably improved compared to electret filters made from 100% polypropylene fibers. The invention primarily concerns electret filters of fibers containing polypropylene and from 1 to 20 percent by weight of PMP, because larger proportions of PMP would currently increase costs. At the present time, the cost of PMP is about 5 to 6 times that of polypropylene.

The improved electret filtration enhancement and improved retention of that enhancement upon exposure to aerosol oils should also be attained when part or all of the polypropylene is replaced by one or more other polyolefins which are substantially free from branched alkyl radicals, e.g., polyethylene, poly-1-butene, and copolymers of these and polypropylene.

The novel fibrous electret filter is especially useful as an air filter element of a respirator such as a facemask or for such purposes as heating, ventilation, and air-conditioning. In respirator uses, the novel electret filters may be in the form of molded or folded half-face masks, replaceable cartridges or canisters, or prefilters. In such uses, an air filter element of the invention is surprisingly effective for removing oily aerosols such as in cigarette smoke or in fumes from combustion engines.

DETAILED DESCRIPTION

Both the polypropylene and the PMP should be substantially free from materials such as surface active and antistatic agents which could increase the electrical conductivity or otherwise interfere with the ability of the fibers to accept and hold electrostatic charges. PMP as supplied as "TPX" grade MX-007 by Mitsui Petrochemical Industries, Ltd., meets this requirement. Furthermore, neither polymer nor the electret filter should be subjected to any unnecessary treatment which might increase its electrical conductivity, e.g., exposure to gamma rays, ultraviolet irradiation, pyrolysis, oxidation, etc.

When producing an electret filter of the invention from melt-blown microfibers, it is believed that there is no advantage to melt-blending the PMP into the polypropylene before introducing them into the extruder, as opposed to loading a mixture of pellets of the two resins directly into the extruder. Equivalent results should also be realized by coextrusion, preferably with a PMP sheath surrounding a polypropylene core in order to provide optimum results at minimum amounts of the relatively expensive PMP. On the other hand, the remarkable results from using only one percent of PMP in melt-blown microfibers suggest that it may be migrating to the surface, regardless of how thoroughly the resins are blended before the melt blowing.

Blown microfibers for fibrous electret filters of the invention typically have an average diameter on the order of from 1 to 10 micrometers. Average diameters of from 2 to 7 micrometers are preferred. In contrast, it is difficult to obtain fibrillated-film fibers smaller than about 10 by 40 micrometers in cross section.

The melt-blown microfibers or fibrillated fibers of the electret filters of the invention can be electrostatically charged by a process described in U.S Pat. Nos. Re. 30,782 or Re. 31,285 or by other conventional methods for charging or polarizing electrets, e.g., by a process of U.S. Pat. Nos. 4,215,682; 4,375,718; 4,588,537; or 4,592,815. In general, the charging process involves subjecting the material to corona discharge or pulsed high voltage.

While other polyolefins of the above-quoted formula of the Mishra patent may be equivalent to PMP in the fibrous electret filters of the invention, none is commercially available so that it has not been possible to test any of them.

Like fibrous filters of the prior art, electret filters of the invention preferably have a basis weight from 5 to 1000 g/m, In making melt-blown microfiber webs, the basis weight can be controlled by changing either the collector speed or the die throughput.

TESTING

Direct comparisons of stability of electret enhancement of fibrous filters are difficult to perform, because filters, even when made to be comparative, typically display differing particulate penetrations and differing pressure drops when subjected to standard filtration test conditions. Reasonably reliable comparisons can be made by subjecting flat samples to an aerosol challenge composed of an oily mist of 0.3-micrometer dioctyl phthalate (DOP) particles. The penetration ("Pen") and the pressure drop ("$\Delta P$" in mm of water) across each sample are measured at a constant flow rate and used to calculate a quality value ["Q" value in (mm $H_2O$ )$^{-1}$] from the natural log (ln) of the penetration by the following formula:

$$Q = \frac{-\ln(\text{Pen})}{\Delta P}$$

A higher initial Q value indicates better initial filtration performance. Decreased Q values effectively correlate with decreased filtration performance.

In comparing polypropylene/PMP webs of the invention to 100% polypropylene webs and to 100% PMP webs, the comparative webs are chosen to have virtually the same solidity, effective fiber diameter and fiber surface area. (For a discussion of solidity and effective fiber diameter, see, Davies, C.N., "The Separation of Airborne Dust and Particles," Institution of Mechanical Engineers, London, Proceedings 1B, 1952). Basis weights are selected to provide the same volume of fiber based on homopolymer densities of 0.90 g/cm$^3$ for 100% polypropylene and 0.83 g/cm$^3$ for 100% PMP. The basis weight for a web of fibers made from a blend of polypropylene and PMP is selected according to a linear interpolation of those two values.

Each web to be tested is cut to a circle 5.25 inches (13.3 cm) in diameter which is mounted in an ATI Q127 DOP Penetrometer, exposing a circular test area 4.5 inches (11.4 cm) in diameter to the aerosol challenge. Comparative testing has been carried out both by an "Aging Test" and a "Loading Test" as follows:

Aging Test

For each electret filter medium or web to be tested, samples are placed in an oven at 70° C. After indicated periods of time, some of the samples are removed and individually subjected to the DOP aerosol challenge for 20 seconds at a concentration of about 100 mg/m$^3$ and a flow rate of 32 liters/min, and then discarded. The penetration and pressure drop are recorded.

Loading Test

An electret filter is subjected, at ordinary room temperature, to the DOP aerosol challenge at a flow rate of 46.7 liters/min. while maintaining the concentration as constant as possible within a range of from 0.15 to 0.2 g/m$^3$. The DOP penetration (Pen) and the pressure drop ($\Delta$P) are monitored throughout a 30-minute period. The samples are weighed before and after exposure to provide a baseline for numerical integration of the accumulated DOP. The DOP is assumed to have a monodisperse particle size distribution. Multi-layer test specimens minimize the effect of sample irregularities.

The integrated total DOP accumulation is a summation of the mass accumulations at one minute intervals. One-minute mass accumulations are calculated by multiplying the measured DOP concentration by (1-Pen) and by the volume of aerosol passing through the sample, assuming constant flow rate and DOP concentration. In doing so, the value for the DOP concentration used in the calculation is selected to cause the calculated mass gain to agree with the weighed mass gain. Agreement between the calculated DOP mass gain and the weighed mass gain has been achieved by adjusting the DOP concentration by less than 5% for all test intervals.

Testing to date indicates that electret filters of the invention experience greater pressure drop increases at equal DOP loadings than do comparable electret filters of 100% polypropylene.

In the following examples, all compositions are given by weight, the PMP was "TPX" grade MX-007 from Mitsui, and the polypropylene was a 12 melt flow index resin from Fina Oil and Chemical Co.

EXAMPLE 1

A number of nonwoven melt-blown microfiber electret filters were made to be as similar to each other as possible except for the chemical composition of their fibers. One of the electret filters was 100% polypropylene, another was 100% PMP, and the others were made from microfibers extruded from mixtures of polypropylene and PMP pellets, the proportions of PMP being 0.2%, 1%, 10%, 30% and 50% (based on total polypropylene and PMP). In each of the electret filters, the effective fiber diameter was controlled between 6.5 and 7.5 $\mu$m, and the web solidity was controlled between 5 and 6%. The mass of each circular [5.25 inches (13.3 cm)] test sample was 0.71 g when 100% polypropylene, 0.66 g when 100% PMP, and a linear interpolation of those two values for the blends of polypropylene and PMP.

Each of the electret filters which contained 10% or more PMP was much softer to the touch than that made of 100% polypropylene and about equally soft to the touch compared to the filter made of 100% PMP.

Average Q values obtained in the Aging Test for ten single-layer electret filters at each time period are recorded in Table I. Average values for the samples containing 0%, 1%, 10%, 30%, 50% and 100% PMP are plotted in FIG. 1 of the drawing.

TABLE I

| % PMP | Average Q values | | | |
|---|---|---|---|---|
| | Initial | 8 hr (70° C.) | 24 hr (70° C.) | 72 hr (70° C.) |
| 0 | 1.23 | 0.79 | 0.74 | 0.64 |
| 0.2 | 1.19 | 0.72 | 0.65 | 0.60 |
| 1 | 1.55 | 0.98 | 1.02 | 0.85 |
| 10 | 1.39 | 0.95 | 0.90 | 0.89 |
| 30 | 1.45 | 1.09 | 0.95 | 0.84 |
| 50 | 1.54 | 1.07 | 1.06 | 0.95 |
| 100 | 1.71 | 1.37 | 1.21 | 1.05 |

Accumulated DOP masses obtained in the Loading Test for single-layer samples of the electret filters of this example are recorded in Table II, both for points at which the Q value had dropped to 75% of its initial value and points at which the Q value had dropped to 50% of its initial value. The mass of DOP collected at these points was determined from the numerical integration of (1-Pen). Average values for samples containing 0%, 1%, 10%, 30%, 50% and 100% PMP are plotted in FIG. 2 of the drawing.

The lower initial Q values reported in Table II are due to the higher flow rate in the Loading Test as compared to the flow rate in the Aging Test.

TABLE II

| % PMP | Initial Q | DOP loading (mg) at 0.75 Q | DOP loading (mg) at 0.5 Q |
|---|---|---|---|
| 0 | 0.57 | 8.7 | 24.9 |
| 0 | 0.55 | 8.6 | 27.9 |
| 0.2 | 0.57 | 7.7 | 23.9 |
| 0.2 | 0.55 | 9.3 | 24.8 |
| 1 | 0.64 | 17.2 | 55.8 |
| 10 | 0.73 | 17.9 | 72.2 |
| 10 | 0.69 | 17.7 | 90.0 |
| 30 | 0.78 | 16.0 | 62.7 |
| 50 | 0.76 | 14.4 | 58.0 |
| 50 | 0.75 | 16.0 | 66.0 |
| 100 | 0.88 | 18.2 | 74.2 |

EXAMPLE 2

The electret filters of Example 1 were tested as 4-layer filters in the Loading Test with results reported in Table III. These results are plotted in FIG. 3 of the drawing. Data obtained in the same Loading Test is plotted in FIG. 4 of the drawing:

TABLE III

| % PMP | Initial Q | DOP loading (mg) at 0.75 Q | DOP loading (mg) at 0.5 Q |
|---|---|---|---|
| 0 | 0.49 | 42.5 | 132.9 |
| 1 | 0.51 | 91.4 | >220 |
| 10 | 0.58 | 115.6 | >220 |
| 30 | 0.62 | 91.5 | >220 |
| 50 | 0.65 | 88.6 | >220 |
| 100 | 0.72 | 152.1 | >220 |

EXAMPLE 3

Two nonwoven electret filters were made from films fibrillated to obtain fibers about 10 by 40 μm in cross section. The first filter was made by coextrusion to form a film of two strata, and fibrillating that film. One of those strata was a blend of 30% PMP and 70% polypropylene, and the other strata was 100% polypropylene, with the overall PMP content of the fibrillated fibers at 15 to 16%.

As a control, another fibrous electret filter was made to be as similar as possible to the first, except that both strata were 100% polypropylene.

Table IV reports average results of the Aging Test at indicated time periods for five samples (single layer) of the electret filter of Example 3 in comparison to five samples of a control made from 100% polypropylene (0% PMP) fibers. Their average masses (for circular test samples 13.3 cm in diameter) were 2.58 g for the filter of Example 3 and 3.12 g for the 0% PMP control filter.

TABLE IV

| | Average Q values | | |
|---|---|---|---|
| % PMP | Initial | 12 hr (70° C.) | 24 hr (70° C.) |
| 0 | 4.3 | 4.0 | 3.6 |
| ~15 | 5.2 | 4.6 | 3.9 |

FIG. 5 of the drawing plots the Q values of 3-layer filters of this Example 3 at increasing levels of DOP accumulation.

Table V reports the levels of DOP necessary to drop the Q value to 75% or 50% of its initial value in the Loading Test for the electret filter of Example 3. Tests were run on single-layer and multi-layer filters. The latter employed differing numbers of layers in order to provide substantially equal masses (for circular test samples 13.3 cm in diameter).

TABLE V

| | Single-layer Filters | | | |
|---|---|---|---|---|
| % PMP | Mass (g) | Initial Q | DOP loading (mg) at 0.75 Q | DOP loading (mg) at 0.5 Q |
| $0^1$ | 1.785 | 2.13 | 12.9 | 28.5 |
| $0^2$ | 2.849 | 1.79 | 13.8 | 34.2 |
| $15^2$ | 2.448 | 1.95 | 20.0 | 50.1 |
| $100^1$ | 1.644 | 1.53 | 15.8 | 38.0 |
| | Multi-layer Filters | | | |
| % PMP | No. of Layers | Mass (g) | Initial Q | DOP loading (mg) at 0.75 Q | DOP loading (mg) at 0.5 Q |
| $0^1$ | 6 | 8.947 | 2.31 | 64.7 | 136.5 |
| $0^2$ | 3 | 8.740 | 1.88 | 48.7 | 112.5 |
| $15^2$ | 3 | 8.642 | 1.98 | 81.3 | 192.5 |
| $100^1$ | 6 | 8.380 | 1.55 | 73.8 | 188.6 |

[1] Single strata fibrillated film fibers
[2] Two strata coextruded fibrillated film fibers

EXAMPLE 4

Three of the nonwoven microfiber electret filters described in Example 1, namely 100% polypropylene, 100% PMP and 10% PMP, were incorporated into molded, cup-shaped respirators as follows:

A cup-shaped "pre-form" filtration layer or body was prepared by laying an approximately 20-cm×20-cm piece of a lightweight fibrous polypropylene cover web (Softlin Development Brand #6724, approximately 33 g/m² from Scott Nonwoven, a division of Scott Paper Company) over an approximately 20-cm×20-cm piece (or pieces as indicated) of the electret web of Example 1 to form a laminate which was folded in half to form an approximately 10-cm×20-cm structure with the cover web constituting the outer layer of the structure. This structure was subjected to a heat sealing procedure to form a generally sinusoidal wave form across the approximately upper one quarter of the structure (near the fold). The waste material between the bond line and the fold was trimmed, and the resulting sealed structure was opened to form a substantially cup-shaped "pre-form" filtration body having an outer layer of polypropylene cover web and an inner layer(s) of electret filter web.

The "pre-form" filtration body was then placed over a semi-rigid, porous, cup-shaped shell, and the three components were heat-sealed together at the perimeter of the respirator. The respirator was mounted on a fixture mounted in an ATI Q127 DOP Penetrometer, and the DOP penetrations and Q values for each respirator were determined as described above under "Loading Test".

Table VI reports the initial penetration and Q values for respirators having one or two filtration layers as well as the penetration and Q values at an extrapolated DOP loading of 100 mg.

TABLE VI

| | Single Filtration Layer | | | |
|---|---|---|---|---|
| | Initial | | Loaded with 100 mg DOP | |
| % PMP | Pen (%) | (Q) | Pen (%) | (Q) |
| 0 | 15.9 | 0.55 | 53 | 0.17 |
| 10(#1) | 8.9 | 0.62 | 21 | 0.36 |
| 10(#2) | 7.4 | 0.63 | 18 | 0.37 |
| 100 | 8.5 | 0.76 | 19 | 0.47 |
| | Two Filtration Layers | | | |
| 0 (#1) | 2.6 | 0.53 | 16 | 0.25 |
| 0 (#2) | 3.2 | 0.50 | 19 | 0.23 |
| 10(#1) | 0.73 | 0.57 | 1.8 | 0.43 |
| 10(#2) | 0.72 | 0.54 | 1.8 | 0.41 |
| 100 | 0.78 | 0.74 | 1.9 | 0.56 |

DOP loading data of the respirators of this example were also analyzed to provide the data reported in Table VII. Because of the complexity of these respirators, the test data reported in Examples 1–3, which were obtained from electret filters in a flat configuration, may be more meaningful.

TABLE VII

| | Single Filtration Layer | | |
|---|---|---|---|
| % PMP | Initial Q | DOP Loading at .75 Q (mg) | DOP Loading at .5 Q (mg) |
| 0 | 0.55 | 25 | 54 |
| 10 (#1) | 0.62 | 49 | 132 |
| 10 (#2) | 0.63 | 53 | 132 |
| 100 | 0.76 | 51 | 156 |
| | Two Filtration Layers | | |
| 0 (#1) | 0.53 | 43 | 94 |
| 0 (#2) | 0.50 | 35 | 87 |
| 10 (#1) | 0.57 | 105 | >257 |
| 10 (#2) | 0.54 | 102 | >250 |
| 100 | 0.74 | 105 | >257 |

THE DRAWING

The invention may be more easily understood in reference to the drawing of which FIG. 1 shows Q values in (mm $H_2O)^{-1}$ obtained in the Aging Test for various single-layer fibrous electret filters made of polypropylene and PMP in various proportions;

Figure 1:
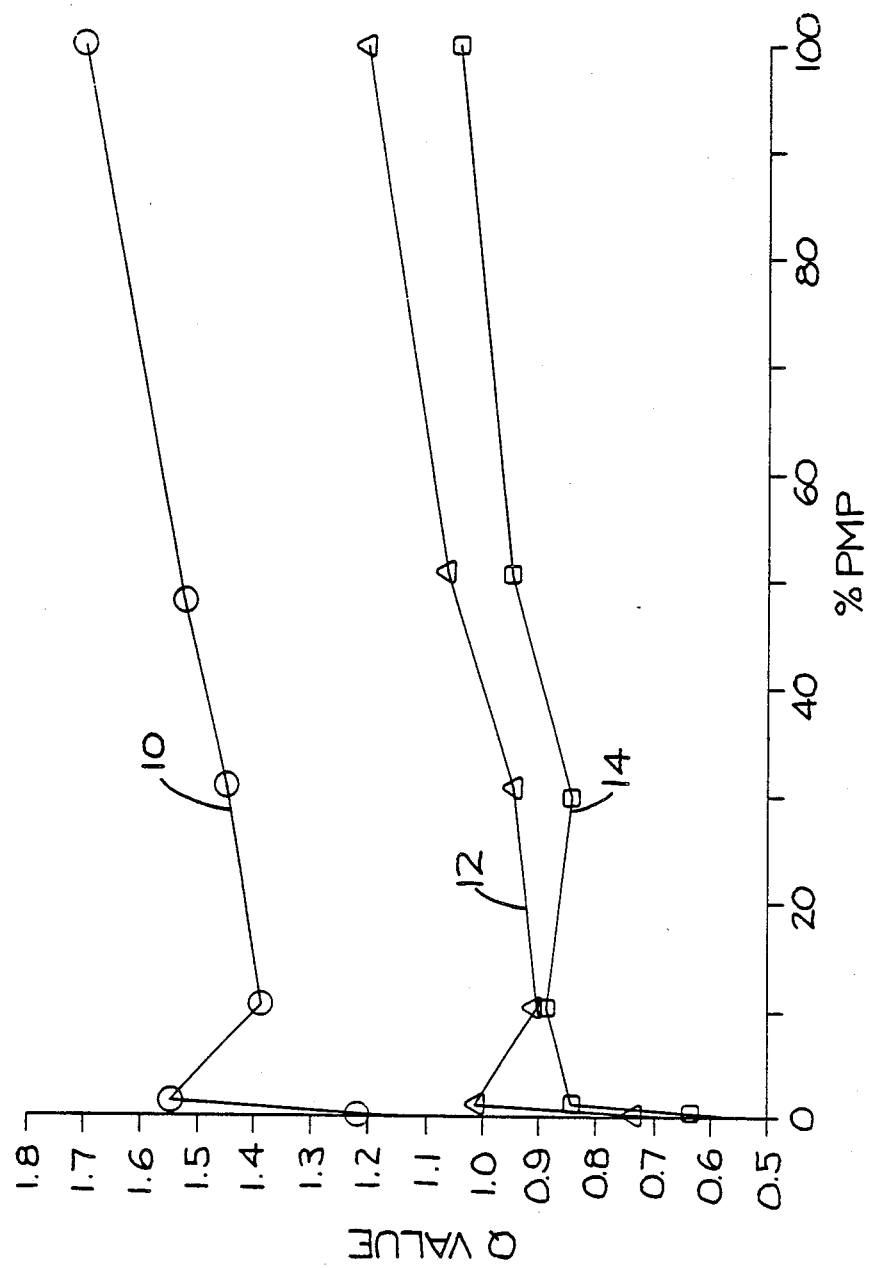

Curve 10 of FIG. 1 shows Q values for unaged melt-blown microfiber electret filters and the surprisingly high Q value of an unaged melt-blown microfiber electret filter having a content of only 1% PMP. The Q value at 1% PMP is closer to the Q value of a comparable electret filter of 100% PMP fibers than to that of an electret filter of 100% polypropylene fibers.

Curves 12 and 14 of FIG. 1 show Q values obtained in the Aging Test after 24 and 72 hours, respectively. After aging for the indicated time periods, the melt-blown microfiber electret filter made of a blend of 1% PMP and 99% polypropylene has remarkably good Q values.

Figure 2:
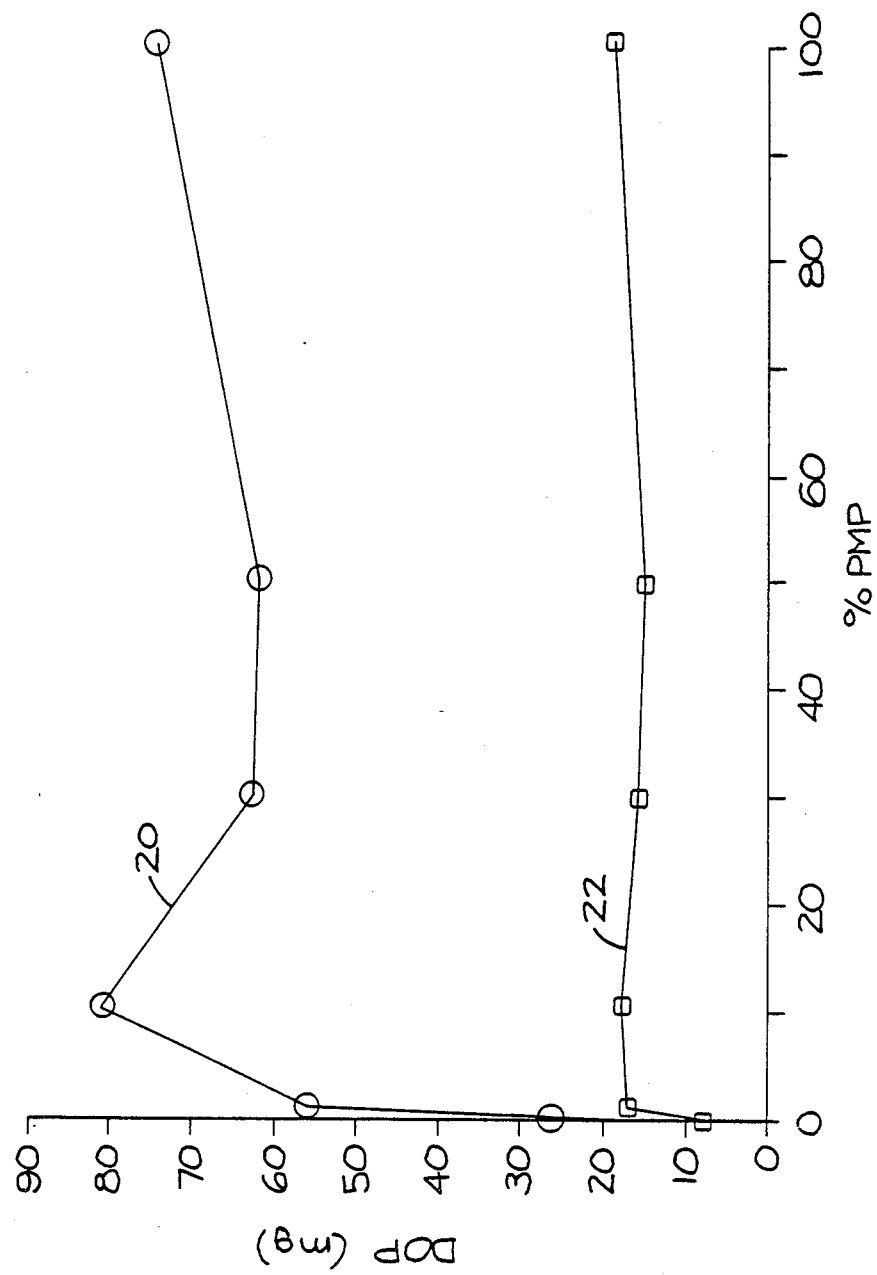
FIG. 2 shows DOP accumulations obtained in the Loading Test for single-layer fibrous electret filters made of polypropylene and PMP in various proportions.

Referring to FIG. 2, curves 20 and 22 show DOP loadings obtained in the Loading Test for single-layer melt-blown microfiber electret filters made of blends of polypropylene and PMP in various proportions. Curve 20 shows DOP loadings at 50% of the initial Q value, and curve 22 shows DOP loadings at 75% of the initial Q value. From curve 20, it can be seen that a melt-blown microfiber electret filter made of 10% PMP and 90% polypropylene, when loaded until its Q value drops to 50% of its initial value in the Loading Test, holds a surprisingly large amount of DOP. From curve 22, it can be seen that a melt-blown microfiber electret filter made of a blend of 1% PMP and 99% polypropylene, when loaded until its Q value drops to 75% of its initial value in the Loading Test, can hold about as much DOP as can melt-blown microfiber electret filters made from higher percentages of PMP.

Figure 3:
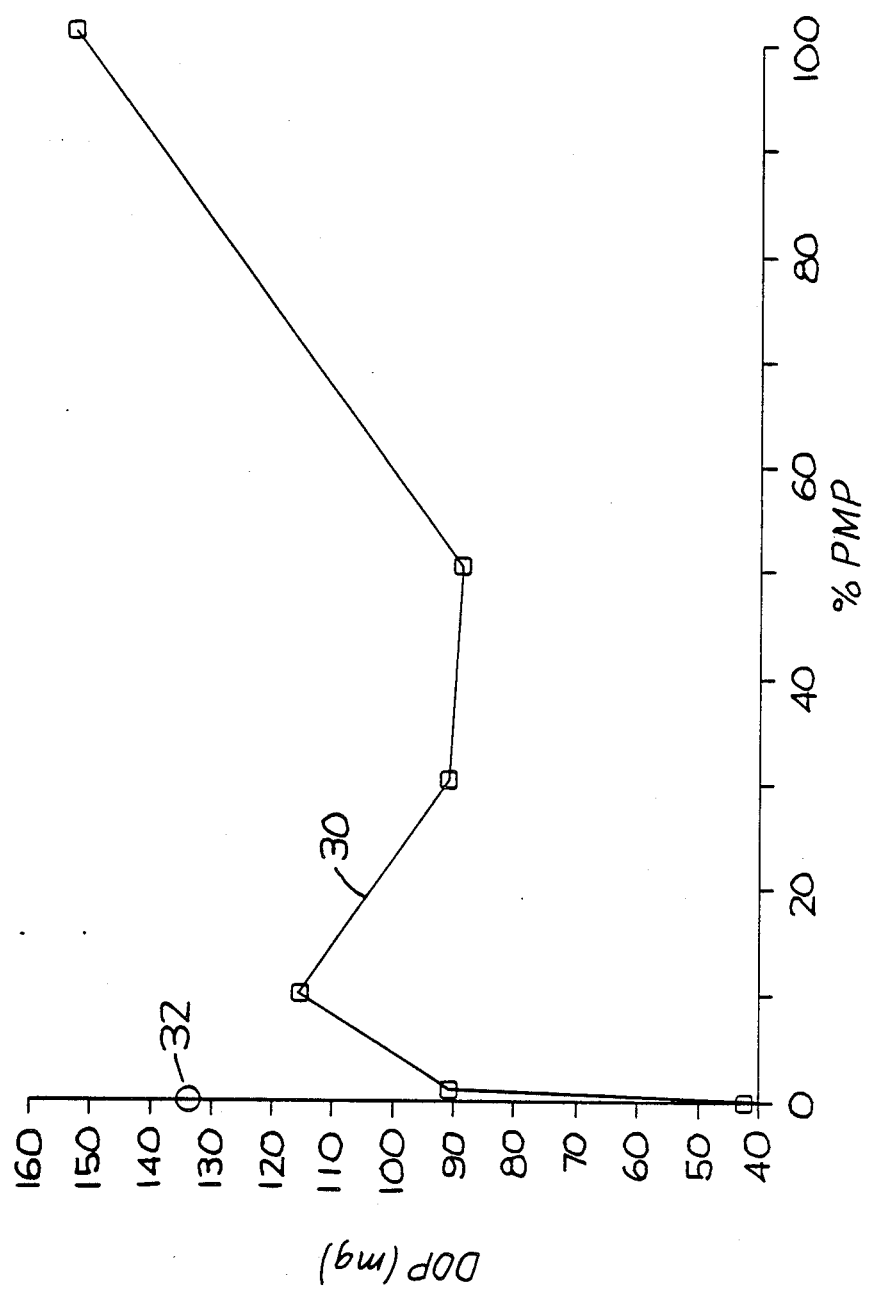
FIG. 3 shows DOP accumulations in the Loading Test for multi-layer electret filters made from the same media used in the tests shown in FIG. 2.

Referring to FIG. 3, curve 30 shows DOP loadings obtained (as tabulated in Table III) when Q values drop to 75% of initial Q value in the Loading Test for 4-layer melt-blown microfiber electret filters made of polypropylene and PMP in various proportions. From curve 30, it can be seen that the electret filter made of a blend of 10% PMP and 90% polypropylene at 0.75 of initial Q value holds more DOP than do melt-blown microfiber electret filters made from higher percentages of PMP. Point 32 of FIG. 3 shows the DOP loading at 50% of its initial Q value in the Loading Test of a 4-layer melt-blown microfiber electret filter made of 100% polypropylene. As reported in Table III, comparable test samples containing 1% or more PMP did not drop to 50% of initial Q value within the 30-minute exposure of the Loading Test, thus evidencing much better resistance to oily mist in contrast to an electret filter which is comparable except being made of 100% polypropylene microfibers.

Figure 4:
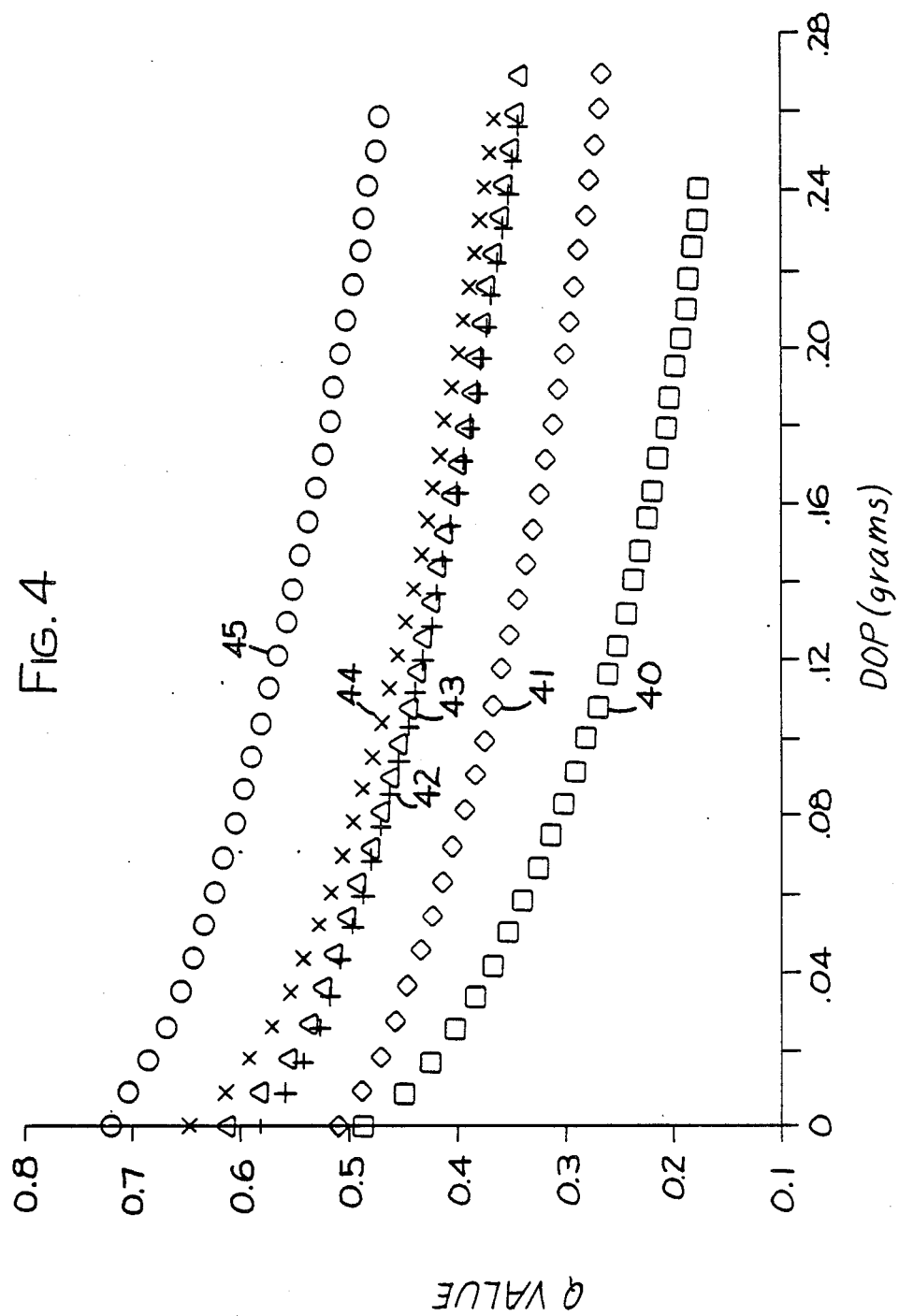
FIG. 4 shows Q values at increasing loadings of DOP obtained in the Loading Test for multi-layer electret filters made from the same media used for the tests shown in FIG. 2.

In FIG. 4, each curve 40-45 is a plot of Q values at increasing amounts of DOP accumulation in the Loading Test for a nonwoven 4-layer electret filter made as disclosed in Example 2 using polypropylene and PMP, the proportions of PMP being:

| Curve | % PMP |
|-------|-------|
| 40 | 0 |
| 41 | 1 |
| 42 | 10 |
| 43 | 30 |
| 44 | 50 |
| 45 | 100 |

Curve 41 shows that a fibrous electret filter containing only 1% PMP is significantly more resistant to degradation in its filtering capabilities when exposed to oily mist than is a filter (curve 40) which is virtually identical except based on 100% polypropylene. Curves 42, 43, and 44 show that results from a PMP content of 10% are comparable to results at much higher PMP contents, again demonstrating that there should be no need to raise the PMP content above 10%, thus effecting substantial economy compared to using higher PMP proportions.

Figure 5:
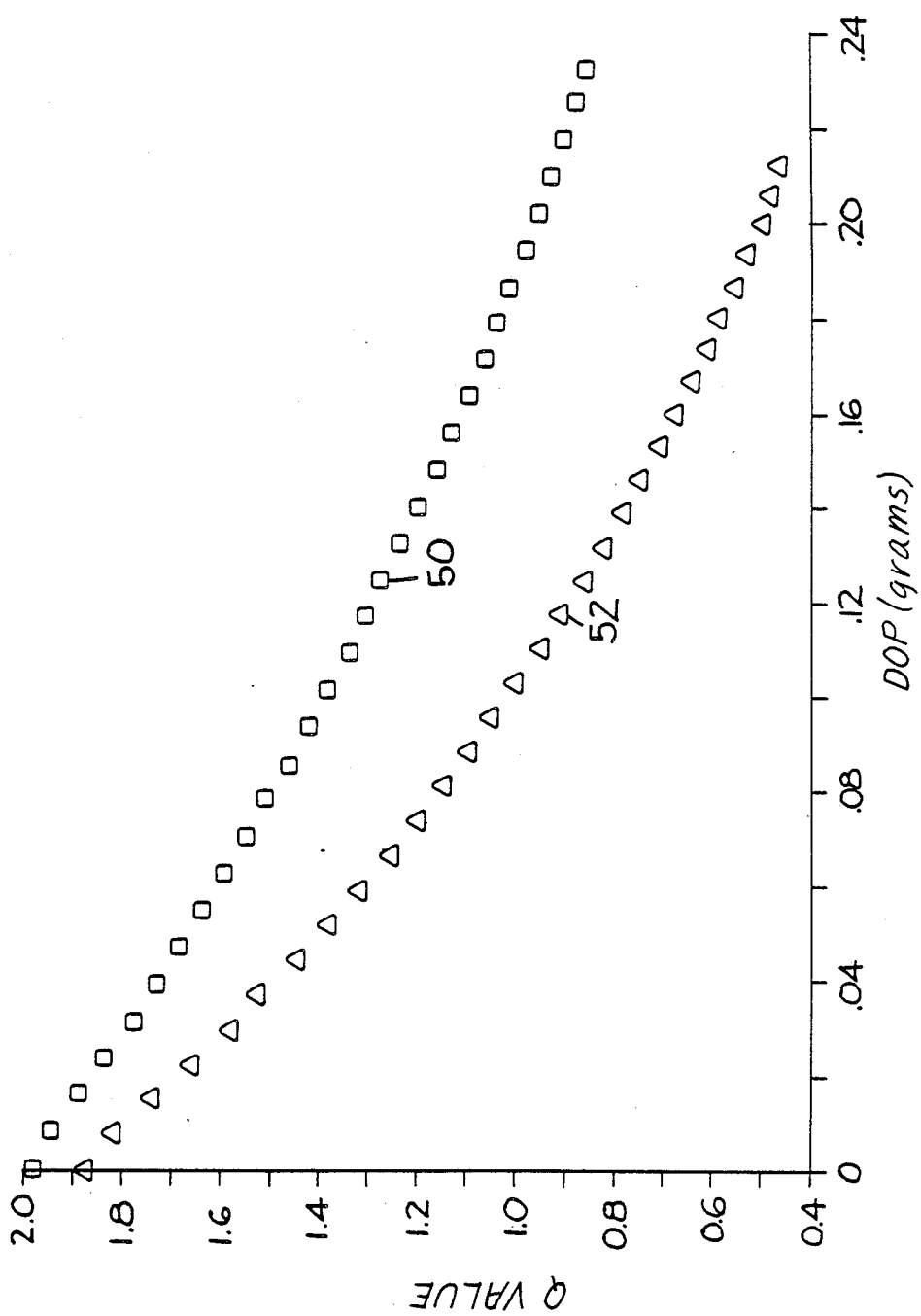
FIG. 5 shows Q values at increasing loadings of DOP obtained in the Loading Test for two 3-layer electret filters made from fibrillated film.

The curve 50 of FIG. 5 is a plot of Q values at increasing amounts of DOP accumulation in the Loading Test for a nonwoven 3-layer electret filter of 15% PMP and 85% polypropylene made as disclosed in Example 3. Curve 52 shows a comparative plot for a virtually identical electret filter except made of 100% polypropylene. A comparison of curves 50 and 52 suggests that PMP-containing electret filters of the invention, the fibers of which are fibrillated film, better retain their filtering ability when exposed to oily mist than does an electret filter which is comparable except being based on fibers of fibrillated film which are 100% polypropylene.

It is assumed that the objectives of this invention are achievable by substituting for all or part of the PMP other polyolefins having a branched side chain and coming within the above-quoted structure of the Mishra patent. As noted above, the current nonavailability of such polymers has prevented the proof of their utility.

Electret filters of the invention can be made from mixtures of fibers, some of which contain both PMP and polypropylene and others of which are 100% PMP or 100% polypropylene or other types of fibers such as staple fibers. Electret filters of the invention can also be made from mixtures of melt-blown microfibers and fibrillated-film fibers, some or all of which contain both PMP and polypropylene.

I claim:

1. Method of removing particulate matter from a gaseous fluid comprising passing the fluid through an electret filter comprising electret fibers containing at least one percent by weight of poly(4-methyl-1-pentene).

2. Method as defined in claim 1 wherein the said electret fibers comprise by weight from 80 to 99 percent of polypropylene and from 1 to 20 percent poly(4-methyl-1-pentene).

3. Method as defined in claim 1 wherein said electret fibers comprise melt-blown microfibers.

4. Electret filter comprising electret fibers containing polypropylene and at least one percent by weight of poly(4-methyl-1-pentene) per 100 parts of total polyolefin.

5. Electret filter as defined in claim 4 wherein the amount of the poly(4-methyl-1-pentene) is up to 50 parts by weight per 100 parts of total polyolefin.

6. Electret filter as described in claim 5 wherein a portion of the electret fibers are 100% polypropylene.

7. Electret filter as defined in claim 4 wherein the electret fibers are mixtures of melt-blown microfibers and fibrillated film.

8. Electret filter as defined in claim 4 wherein the electret fibers are mixtures of melt-blown microfibers and staple fibers.

9. Electret filters as defined in claim 4 wherein the amount of the poly(4-methyl-1-pentene) is up to 20 parts by weight per 100 parts of total polyolefin.

10. Electret filter as defined in claim 4 wherein each of the electret fibers has a polypropylene core and poly(4-methyl-1-pentene) at its surface.

11. Electret filter as defined in claim 4 wherein the electret fibers are fibrillated film.

12. Electret filter as defined in claim 11 wherein the electret fibers comprise strata, one of which is 100% polypropylene while another comprises poly(4-methyl-1-pentene).

13. Electret air filter element comprising polyolefin electret fibers, at least one percent by weight of the polyolefin being poly(4-methyl-1-pentene).

14. Electret air filter element as defined in claim 13 wherein at least 50 percent by weight of the polyolefin is polypropylene.

15. Electret air filter element as defined in claim 14 wherein the amount of the poly(4-methyl-1-pentene) is up to 20 parts by weight per 100 parts of total polyolefin.

16. Electret air filter element as defined in claim 15 wherein at least 80 percent by weight of the polyolefin is polypropylene.

17. Electret air filter element as defined in claim 13, the basis weight of which is from 5 to 1000 g/m$^2$.

18. Electret air filter element as defined in claim 13 wherein said filter element comprises a respirator.

19. Respirator as defined in claim 18 and further comprising a semi-rigid, porous, cup-shaped shell.

20. Respirator as defined in claim 18 wherein the electret fibers comprise melt-blown microfibers.

* * * * *

UNITED STATES PATENT AND TRADEMARK OFFICE
CERTIFICATE OF CORRECTION

PATENT NO. : 4,874,399

DATED : October 17, 1989

INVENTOR(S) : John F. Reed and Marvin E. Jones

It is certified that error appears in the above-identified patent and that said Letters Patent is hereby corrected as shown below:

Column 4, line 29, delete the comma after "g/m" and insert a period.

Column 11, line 14,(claim 9), change "filters" to -- filter --.

Signed and Sealed this

Eighteenth Day of December, 1990

Attest:

HARRY F. MANBECK, JR.

Attesting Officer

Commissioner of Patents and Trademarks